United States Patent Office 3,392,127
Patented July 9, 1968

3,392,127
COMPOSITION OF POLYESTER RESIN AND
SODIUM SILICATE
Yves du Tertre, 28 Rue de Chateaudun,
Paris, France
No Drawing. Continuation-in-part of application Ser. No. 250,210, Jan. 9, 1963. This application Jan. 14, 1966, Ser. No. 520,807
Claims priority, application France, May 9, 1958, 18,083, Patent 1,195,743; Apr. 24, 1962, 895,341, Patent 81,527
9 Claims. (Cl. 260—2.5)

ABSTRACT OF THE DISCLOSURE

The invention involves a new composition useful as a structural material which combines polyester resin with sodium silicate and a filler such as dolomite limestone. This product has good endurance against water and weather.

---

This is a continuation in part of my copending application for United States patent, No. 250,210, filed Jan. 9, 1963, now abandoned, and a continuation in part of application 811,819, filed May 8, 1959, now abandoned, which describes a mouldable and hardenable composition containing polyester resin, sodium silicate, and a magnesian or calcareous filler such as dolomite.

This composition has particularly advantageous properties, resulting firstly from the presence of the polyester resin and secondly from the low cost of the filler used. The calcareous or magnesian filler imparts to the composition a considerable degree of hardness and remarkable mechanical characteristics.

Two different methods can be adopted for the preparation of such a composition.

The sodium silicate may be in powder form, in which the weight ratio of silicon to sodium may range from 2:1 to 3.5:1 and is preferably about 3.3:1, this being the proportion which enables the most satisfactory resistance of the composition to water and to weather conditions to be obtained.

The three constituents of the composition are preferably used in proportions by weight ranging from 10 to 50% of the total for the polyester resin, 1 to 3 times the latter for the magnesian of calcareous filler, and 20 to 70% of the weight of the polyester resin for the sodium silicate. The composition preferably comprises sodium silicate in a proportion of 30–35% by weight in relation to the polyster resin and the magnesian or calcareous filler in a proportion of 2–3 times the weight of the polyester resin.

To the polyester resin used is added an appropriate accelerating agent, and the sodium silicate. In one example, use is made of 225 grams of polyester resin, 1 gram of accelerator and 75 grams of sodium silicate. To this mixture is added a styrene monomer as commonly used with polyster resins; in one example, the quantity used is 150 grams. A silicone (e.g., 0.2 gram) may then be added, after which there are added, while shaking the mixture constantly, 600 grams of dolomite, 5 grams of fluosilicate and 4 grams of a catalyst such as is usually employed for polyester resins.

Suitable polyester resins for carrying out the invention are as follows.

| Acid: | Glycol |
|---|---|
| Malic phthalic | Monopropylene. |
| Malic phthalic | Monopropylene. |
| Malic phthalic | Monopropylene. |
| Isophthalic malic | Diethylene. |
| Isophthalic malic | Monopropylene. |
| Malic adipic | Diethylene. |

There may also be used the polyester resins manufactured in the United States and set forth in United States Patents No. 2,429,219 and 3,006,876.

The polymerization may be carried out hot or cold. In the former case, no accelerator is required, and all that is necessary is to prepare the mixture at the temperature desired, the optimum temperature being 47° C. for some of the polyester resins listed above. Once the mixture has been prepared, polymerization is carried out at a temperature between 80 and 110° C.

The type of polyester resin used is not critical, and any polymerizable polyester resin appropriate to the intended use of the composition may be utilized.

If cold polymerization is adopted, use is then made of an accelerator, such as cobalt naphthenate, the reaction then being exothermic.

In the composition indicated above, the polyester resin can be used in a proportion by weight varying from 10 to 50%. If the proportion of polyester is increased, the hardness of the product is reduced.

The sodium silicate, which gives the finished product a better adhesion to glass fibres, is used in a proportion varying between 25 and 70% of the weight of the resin; the proportion of sodium silicate is preferably 33–44% since any higher proportion makes the composition too adhesive.

Nevertheless, if a particularly adhesive property is desirable, the following formula is suitable:

| | Grams |
|---|---|
| Polyester resin | 225 |
| Sodium silicate | 125 |
| Dolomite | 250 |
| Fluosilicate | 4 |
| Silicone | 0.2 |
| Catalyst (benzoyl peroxide) | 4 |
| Accelerator | 1 |

This composition contains no styrene, which would deprive the resin of some of its adhesive power.

Where styrene is employed, this enables the resin to be rendered more fluid and to wet more satisfactorily and fibre glass added to the composition. Furthermore, when styrene copolymerizes with the polyester it gives the finished product greater rigidity and more resistance to abrasion and impacts. Styrene may be used in a proportion by weight of 20–100% of that of the resin.

The calcareous or magnesian filler combines with the sodium silicate to produce a very hard cement. Use has already been made of such fillers in polyester resins, but when they are used alone the mechanical properties of the composition are reduced by them. However, in the composition of the present, invention, containing sodium silicate, such fillers become active and assist in increasing the mechanical properties of the composition, particularly its resistance to heat and combustion. Magnesian and calcareous fillers, such as dolomite, may be used up to a maximum of 600 grams per 200 grams of resin.

The fluosilicate used in the compositions described above, which is not essential, acts as an accelerator for the bonding between the dolomite and the sodium silicate and increases the resistance of the composition to water and to weather-conditions.

The purpose of any silicone used in the composition described in the foregoing is to increase the resistance of the final product to water and to render it shinier. It also acts as an internal lubricant. A proportion by weight of 1 to 6% of that of the resin is sufficient.

The following is a further example of a composition particularly useful as a floor covering:

|  | Grams |
|---|---|
| Polyester resin | 180 |
| Polyester resin | 45 |
| Sodium silicate | 75 |
| Styrene | 150 |
| Dolomite | 300 |
| Powdered silica | 400 |
| Silicone | 0.2 |
| Fluosilicate | 6 |
| Catalyst | 4 |

The mixture is prepared as described in connection with the first method, by the "hot" process at 37° C., and glass fibre in bulk is added at the rate of 3% by weight of the mixture. After polymerization at 110° C. the composition may be used in the form of tiles for floor covering. The resistance of such tiles to abrasion is remarkable. (A standard test with a Dory Wheel revealed a wear of only 1.54 millimetres after the Dory Wheel had covered 1000 metres.)

In a second method of preparing a composition in accordance with the invention, use is made of liquid sodium silicate in aqueous solution. A first step comprises dilution of fluosilicate in an aqueous solution of sodium silicate. Then polyester resin, catalyst, accelerator and styrene are mixed separately, and thereafter added drop by drop to the aqueous solution, while constantly shaking the mixture. Silicone is then added, and finally dolomite is introduced.

The mixture obtained can polymerize either cold or hot.

A composition with excellent mechanical properties is obtained by using silicate having a weight ratio Si/Na of 3.3/1.

A particularly suitable composition, prepared by the method just described, is indicated below:

|  | Grams |
|---|---|
| Liquid sodium silicate | 100 |
| Water | 10 |
| Polyester resin | 30 |
| Styrene | 15 |
| Accelerator | 0.8 |
| Catalyst | 1.2 |
| Fluosilicate | 5 |
| Dolomite | 50 |

Such a composition may be formed into an expanded material having remarkable heat- and sound-insulating properties, and a very high melting-point.

According to a further optional feature powdered aluminum may be introduced into the composition detailed above, and the following is an example:

|  | Grams |
|---|---|
| Liquid sodium silicate | 100 |
| Water | 10 |
| Polyester resin | 20 |
| Styrene | 10 |
| Catalyst | 0.4 |
| Silicone | 0.1 |
| Fluosilicate | 4 |
| Dolomite | 130 |
| Aluminum | 2.23 |

This mixture is prepared as indicated above and polymerization is carried out at a temperature between 80 and 120° C. for a period of 20 minutes; this results in an expanded material of which the volume is 4 times the initial volume and the density 0.3 of the original density after complete evaporation of the water, after the elapse of a few hours. Fibre glass in bulk can be added to the mixture in any desired proportions, e.g., 1–4 grams for the amounts given above.

In order to improve the mechanical strength of the composition, the ratios between the different constituents may be varied within the limits specified in the foregoing.

The quantity of aluminum used ranged from 1 to 5 grams per 100 grams of liquid sodium silicate; the expansion of the final material depends on the quantity of aluminum used.

I claim:
1. A composition of matter comprising polyester resin of an acid selected from the group consisting of malic phthalic, malic adipic and isophthalic malic together with a glycol selected from the group consisting of monopropylene glycol and diethylene glycol, sodium silicate, and a dolomite filler wherein the polyester resin is in a proportion by weight between 10 and 50% of the total, wherein the filler is in a proportion by weight 1 to 3 times that of the polyester resin, and wherein the sodium silicate is in a proportion by weight between 20 and 70% of the weight of the polyester resin.

2. The composition claimed in claim 1 wherein the sodium silicate is in a proportion by weight between 30 and 35% of the polyester resin, and wherein the filler is in a proportion by weight 2 to 3 times the weight of the polyester resin.

3. The composition claimed in claim 1 wherein the composition includes styrene.

4. The composition claimed in claim 1 including a fluosilicate in a proportion by weight less than 8% of the weight of the sodium silicate.

5. The composition claimed in claim 1 wherein the sodium silicate has a proportion by weight of silicon to sodium comprised between 2/1 and 3.5/1.

6. The composition claimed in claim 1 incorporating glass fibre constituting between 1 and 40% by weight.

7. The composition claimed in claim 1 having its constituents dry mixed, the sodium silicate being in the form of powder.

8. The composition claimed in claim 1 when produced by a process including the steps of adding the constituents of the polyester resin to an aqueous solution of sodium silicate, introducing the filler, and polymerizing.

9. The composition claimed in claim 1, including, to form an expanded product, a proportion by weight of aluminium to sodium silicate in the range of 1 to 5%.

References Cited
UNITED STATES PATENTS

| | | | |
|---|---|---|---|
| 2,664,405 | 12/1953 | Anderson et al. | 260—40 |
| 2,809,946 | 10/1957 | Blegen et al. | 260—22 |
| 2,809,946 | 19/1957 | Blegen et al. | 260—22 |
| 3,227,665 | 1/1966 | Fourcade et al. | 260—40 |
| 3,255,029 | 6/1966 | Gorick | 260—40 |

MURRAY TILLMAN, *Primary Examiner.*

J. C. BLEUTGE, *Assistant Examiner.*